W. ROSENBERG.
CARD AND OTHER CASE.
APPLICATION FILED MAR. 27, 1915.
1,173,388.
Patented Feb. 29, 1916.
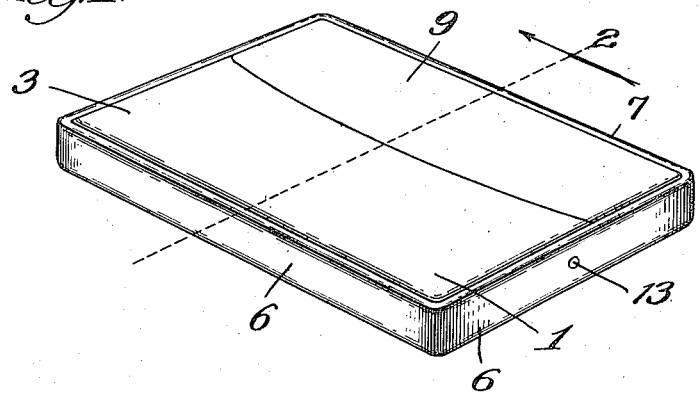
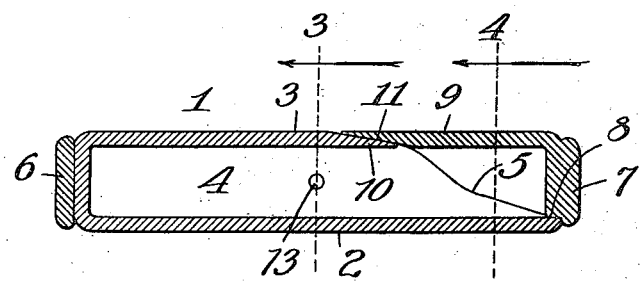
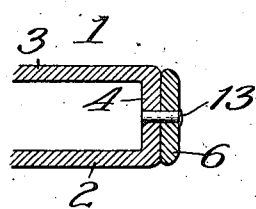
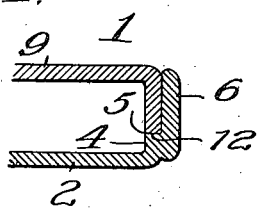
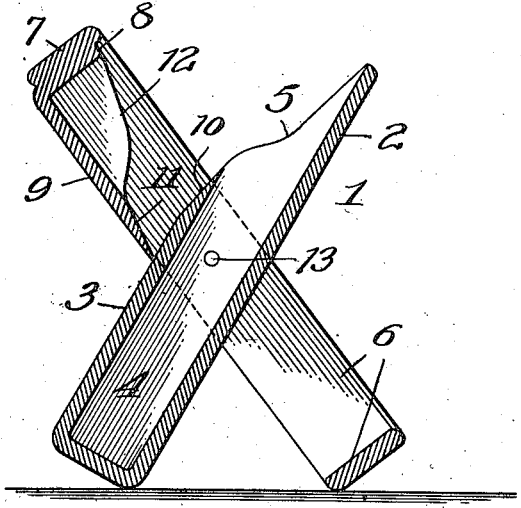
Witnesses:
Inventor:
William Rosenberg,
By David H. Fletcher,
Atty.

UNITED STATES PATENT OFFICE.

WILLIAM ROSENBERG, OF CHICAGO, ILLINOIS.

CARD AND OTHER CASE.

1,173,388.

Specification of Letters Patent. Patented Feb. 29, 1916.

Application filed March 27, 1915. Serial No. 17,408.

*To all whom it may concern:*

Be it known that I, WILLIAM ROSENBERG, a citizen of the United States, residing at Chicago, in the county of Cook and State of Illinois, have invented certain new and useful Improvements in Card and other Cases, of which the following is a description, reference being had to the accompanying drawings, forming a part of this specification, in which corresponding numerals of reference in the different figures indicate like parts.

The object of my invention is to provide a simple, cheap and attractive container or case adapted for holding cards, cigars, cigarettes, matches, soap or other articles, which device shall be so constructed as to be self contained with no disconnected or removable parts.

To this end, my invention consists in the combination of elements hereinafter more particularly described and definitely pointed out in the claims.

In the drawings, Figure 1, is a perspective front view of a container embodying the features of my invention, as it would appear when closed, Fig. 2, is a transverse sectional view taken upon the line 2—, Fig. 1, viewed in the direction of the arrow there shown, Fig. 3, represents a section taken upon the line 3—, Fig. 2, Fig. 4, a section taken upon the line 4, viewed as indicated by the arrows shown in said figures respectively, and Fig. 5, is a transverse vertical sectional view of the device as it would appear when open.

Referring to the drawings, 1, indicates generally, a container formed from metal, celluloid or other suitable material, and preferably stamped, molded or otherwise wrought, in one piece. In the example illustrated, I have shown the structure of substantially rectangular form having a rear wall 2, of the full height of the container and a front wall 3, of lesser height, the end walls 4, being chamfered or cut away as shown at 5, Figs. 2 and 5.

The closure, which is intended to be permanently attached to the main structure or container, consists of an endless band-like member 6, preferably of the same width as that of the container, and adapted to fit around the periphery thereof so as to shield or inclose the ends, top and bottom when closed, as clearly shown in Figs. 1 and 2. I prefer to make the top portion of said band or peripheral inclosing member somewhat thicker than the sides and bottom as shown at 7, Figs. 1 and 5, and to provide a shoulder 8, Figs. 2 and 5, beneath the same to serve as a stop for the upper edge of the back wall 2, when the device is closed as shown in Fig. 2. A front flange or closing wall 9, is arranged to depend from the part 7, so as to fit against the upper edge of the front wall 3, when the parts are closed and thus form a continuation thereof as shown. The upper outer edge of the front wall is beveled as shown at 10, while the lower inner edge of the part 9, is also beveled as indicated at 11 to form a counterpart thereto as clearly shown in Figs. 2 and 5.

In forming the device from relatively fragile material, such, for example, as celluloid, I prefer to place shoulders 12, upon the inner faces of the upper portions of the end walls 6, formed to fit the parts 5, of the end walls of the container. This feature serves to reinforce and add strength to the peripheral inclosing member 6, without lessening the capacity of the container. The member 6 is pivotally connected upon a common axis to the end walls of the container by means of pins or trunnions 13, which pivots are located midway between the front and rear and midway between the top and bottom of the structure, or in other words in the plane of the longitudinal axis, midway between the ends.

When it is desired to open the case, the operator presses in one direction upon the lower part of the container and in the opposite direction upon the part 6, when the parts are caused to assume the relative positions shown in Fig. 5,—the lower edge of the part 9, serving as a stop to limit the movement of the coacting members so as to enable them when open to form a self-supporting stand as shown in Fig. 5.

I do not wish to be limited to the exact construction shown inasmuch as the device may be varied in proportions, general contour and cross sectional form to meet varying requirements without departing from the spirit and principle of the invention.

Having thus described my invention, I claim:

1. A container of the class described, comprising, in combination, a receptacle open at the top and the upper part of the front, a closure therefor consisting of counterpart portions formed to close the top and front opening, the lower edge of the front portion of said closure being arranged to contact with the front wall of the receptacle to limit the extent of the opening, while a portion of the outer face of said wall is formed to abut against a counterpart portion of the inner face of the front of said closure to form a stop to prevent the front of the closure from being moved rearwardly past the front of said receptacle and end portions integral with said closure, said end portions being trunnioned upon the end walls of the receptacle substantially midway between the top and bottom thereof.

2. A container of the class described, comprising, in combination, a receptacle open at the top and the upper part of the front, a closure therefor consisting of a counterpart member adapted to close the opening at the top and front, the lower edge of said counterpart member being arranged to contact with the front wall of the receptacle to limit the extent of movement of said member in one direction, a portion of the upper outer face of said wall being beveled to fit against a counterpart beveled portion upon the inner face of the lower edge of the front wall of said closure and end portions rigidly connected with said closure, said end portions being trunnioned upon the end portions of said receptacle substantially midway between the top and bottom thereof and forming a part of a band adapted to extend beneath said bottom when the receptacle is closed.

3. A device of the class described, comprising, in combination, a substantially flat four walled receptacle open at the top and the upper part of the front, and a closure therefor consisting of a counterpart front portion and an integral endless band portion, the latter being arranged to extend around the top, bottom and side edges of said receptacle, to the latter of which it is pivoted between the top and bottom, said closure being provided with means for preventing it from being opened except by a movement in one direction.

In testimony whereof, I have signed this specification in the presence of two subscribing witnesses, this 25th day of March, 1915.

WILLIAM ROSENBERG.

Witnesses:
DAVID H. FLETCHER,
JENNIE L. FISKE.